(12) United States Patent
Lee et al.

(10) Patent No.: US 10,439,717 B2
(45) Date of Patent: Oct. 8, 2019

(54) VISIBLE LIGHT COMMUNICATION SYSTEM AND TRANSMISSION CONTROL METHOD THEREIN

(71) Applicant: UNIVERSITY-INDUSTRY COOPERATION GROUP OF KYUNG HEE UNIVERSITY, Yongin-si (KR)

(72) Inventors: Kye San Lee, Yongin-si (KR); Doohee Han, Gunpo-si (KR); Kyun-Tak Kim, Suwon-si (KR); Hyun Song Shin, Suwon-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 15/779,148

(22) PCT Filed: Nov. 25, 2016

(86) PCT No.: PCT/KR2016/013704
§ 371 (c)(1),
(2) Date: May 25, 2018

(87) PCT Pub. No.: WO2017/091035
PCT Pub. Date: Jun. 1, 2017

(65) Prior Publication Data
US 2018/0269969 A1 Sep. 20, 2018

(30) Foreign Application Priority Data
Nov. 25, 2015 (KR) ........................ 10-2015-0165759

(51) Int. Cl.
*H04B 10/116* (2013.01)
*H04N 19/30* (2014.01)
*H04B 17/24* (2015.01)
*H04B 17/336* (2015.01)

(52) U.S. Cl.
CPC ........... *H04B 10/116* (2013.01); *H04B 17/24* (2015.01); *H04B 17/336* (2015.01); *H04N 19/30* (2014.11)

(58) Field of Classification Search
CPC ........ H04B 10/116; H04B 10/11; H04B 10/00
See application file for complete search history.

(56) References Cited

U.S. PATENT DOCUMENTS

2009/0295905 A1\* 12/2009 Civanlar ............. H04L 12/4604
348/14.09
2010/0209105 A1 8/2010 Shin et al.
(Continued)

FOREIGN PATENT DOCUMENTS

| JP | 4112632 | 7/2008 |
| KR | 10-2007-0076692 | 7/2007 |
| KR | 10-2013-0037658 | 4/2013 |

OTHER PUBLICATIONS

Ratan Kumar Mondal et al., "Interference-aware Optical Resource Allocation in Visible Light Communication", 2012 International conference on ICT Convergence (ICTC), Oct. 17, 2012.
(Continued)

*Primary Examiner* — Dzung D Tran
(74) *Attorney, Agent, or Firm* — Lex IP Meister, PLLC

(57) ABSTRACT

Disclosed are a visible light communication system and a method for controlling transmission in the same.
In the system, a transmission control server receives video data and encodes the received video data into a layer signal of a scalable video coding (SVC) bitstream and controls a signal for each layer to be allocated and transmitted to a plurality of illuminations of a channel corresponding to a priority for each channel decided according to a channel state depending on an interference amount fed back from a reception apparatus according to an importance of the signal for each layer of the SVC bitstream. A reception apparatus receives video signals of SVC bitstreams transmitted from the plurality of illuminations and SVC-decoding the received video signals to generate video data and calculates
(Continued)

the interference amount for each channel based on reception power measured for each channel of the received video signal and feeds back the calculated interference amount to the transmission control server. Herein, the reception apparatus determines that a channel having a relatively large interference amount is better in a channel state and feeds back the determination to the transmission control server, the transmission control server allocates a layer signal having a high importance to an illumination of a channel having a high priority, the reception apparatus sets a channel in which the interference amount is less than a predetermined threshold value as a channel in which transmission is impossible and feeds back the channel to the transmission control server, and the transmission control server excludes a corresponding channel at the time of deciding the priority so as not to allocate the layer signal to the illumination corresponding to the channel in which the transmission is impossible.

7 Claims, 6 Drawing Sheets

(56) References Cited

U.S. PATENT DOCUMENTS

| | | |
|---|---|---|
| 2013/0004183 A1 | 1/2013 | Jang et al. |
| 2013/0279606 A1 | 10/2013 | Vanam et al. |
| 2013/0315124 A1* | 11/2013 | Rapaport ................ H04W 4/08 370/312 |
| 2016/0330457 A1* | 11/2016 | Ye ........................... H04N 9/67 |

OTHER PUBLICATIONS

Kyujin Lee et al., "Co-channel Interference reduction using Multi code MC-CDMA in Visual Light Communication System", Journal of Digital Convergence, vol. 12, Issue 8, pp. 249-255, Aug. 20, 2014.

EPO, Extended European Search Report of the corresponding European Patent Application No. 16868931.3., dated Jul. 3, 2019.

* cited by examiner

VISIBLE LIGHT COMMUNICATION SYSTEM AND TRANSMISSION CONTROL METHOD THEREIN

TECHNICAL FIELD

The present invention relates to a visible light communication system and a method for controlling transmission in the same.

BACKGROUND ART

A scalable video coding (SVC) technique has attracted attention as an effective method in a situation where a video transmission system needs to transmit video to multiple terminals.

Since the type and required performance of the terminal receiving the video transmitted by the video transmission system are different, it is difficult to use the SVC technique by the video having only one quality for various purposes.

In the SVC technique, multiple videos having various frames and various types of resolutions are transmitted in transmitting the video so as to select and reproduce the video according to the terminal receiving the video.

In the SVC technique, the video is divided into a base layer which is a minimum signal for video reproduction and N (N is a natural number) enhanced layers serving to enhance a video quality received in combination with the base layer.

Signals of the two types of layers have different importance and required bit error rate (BER) performance also varies according to the layer.

According to the SVC technique, a video signal transmitted from the video transmission system enables high-level video bitstream coding in transmitting high-quality moving picture information through a communication network.

Meanwhile, visible light communication using an illumination such as an LED is technology that attracts much attention in academia and industry fields because the visible light communication uses both the illumination and a communication function. In particular, the visible light communication attracts much attention as a kind of short-range wireless network in an indoor environment such as an exhibition hall, an office, or a home.

However, in the visible light communication, it is difficult to transmit the image signal according to the SVC technique through a plurality of illuminations due to a problem that interference occurs between adjacent illuminations by using illuminations of the same color.

Accordingly, required is a method for providing a stable illumination service in an environment in which the plurality of illuminations is installed and at the same time, enabling efficient video transmission.

DISCLOSURE

Technical Problem

The present invention has been made in an effort to provide a visible light communication system capable of configuring an efficient visible light communication network while providing a stable illumination service in an environment in which a plurality of LED illuminations is installed and a method for controlling transmission in the.

Technical Solution

An exemplary embodiment of the present invention provides a transmission apparatus including, an encoder receiving video data and encoding the received video data with a scalable video coding (SVC) bitstream, wherein the SVC bitstream is divided into a base layer signal to be transmitted and at least one enhancement layer signal, which is combined with the base layer signal and enhances the quality of moving picture information; an allocation control unit deciding a priority for each channel according to a channel state depending on an interference amount fed back from a reception apparatus; and an illumination allocation unit allocating the layer signal encoded by the encoder according to the priority for each channel decided by the allocation control unit and allocating the allocated layer signal to a plurality of illuminations corresponding for each channel, wherein the plurality of illuminations is illuminations which are capable of performing visible light communication with the reception apparatus.

Herein, the allocation control unit may decide the priority for each channel so that a layer signal having high importance is allocated to a channel having a high priority for each channel.

Further, the interference amount may be an interference amount, based on reception power measured with respect to a reception signal received for each channel by the reception apparatus, from reception powers of remaining channel signals except for a reference channel signal to the reception power of the reference channel signal.

In addition, the allocation control unit may include an impossible channel determination unit determining whether there is information of a channel in which transmission is impossible among the channel information fed back from the reception apparatus, and a priority decision unit deciding the priority for each channel by using the channel information fed back from the reception apparatus and a determination result by the impossible channel determination unit, and the priority decision unit may decide the priority for each channel only for the remaining channels except for the channel in which the transmission is impossible when it is determined that there is the channel in which the transmission is impossible by the impossible channel determination unit.

Another exemplary embodiment of the present invention provides a reception apparatus including, a power measuring unit measuring reception powers of video signals of scalable video coding (SVC) bitstreams, wherein the SVC bitstreams are divided into a base layer signal to be transmitted and at least one enhancement layer signal, which is combined with the base layer signal and enhances the quality of moving picture information, transmitted from a plurality of illuminations, wherein the plurality of illuminations is illuminations capable of performing visible light communication, respectively; an interference amount calculating unit calculating each of interference amounts for each channel by using each reception power measured by the power measuring unit and feeding back channel state information determined by the calculated interference amount for each channel to a transmission control server performing transmission control for the plurality of illuminations; an interference removing unit performing the same interference channel-to-channel interference removal with respect to each of the video signals; a layer allocation unit allocating a signal from which interference is removed by the interference removing unit as a layer signal of the SVC bitstream and outputting the layer signal based on the channel state information determined by the interference amount calculating unit; and a decoder combining the SVC bitstream output from the layer allocation unit and outputting the SVC bitstream as video data.

Herein, the interference amount calculating unit may determine that a channel state in a channel having a large calculated interference amount is better than that in a channel having a small interference amount.

Further, when the interference amount calculated for the channel is less than a predetermined threshold value, the interference amount calculating unit may set the corresponding channel as a channel in which transmission is impossible and feed back the set channel to the transmission control server.

Further, the interference amount may be a value calculated by a desired-to-undesired power ratio (DUR).

Yet another exemplary embodiment of the present invention provides A method for controlling transmission of a vide signal using a plurality of illuminations by a visible light communication system, including, receiving a feedback of information of a channel state depending on an interference amount from a reception apparatus receiving video signals of scalable video coding (SVC) bitstreams, wherein the SVC bitstreams are divided into a base layer signal to be transmitted and at least one enhancement layer signal, which is combined with the base layer signal and enhances the quality of moving picture information, from the plurality of illuminations; deciding a priority for each channel based on the channel state information; and controlling the layer signals of the SVC bitstream to be allocated to the plurality of illuminations and transmitted to the reception apparatus based on the priority for each channel and an importance for each layer of the SVC bitstream corresponding to the video data to be transmitted.

Herein, in the deciding of the priority for each channel, when there is information on a channel in which transmission is impossible in the information fed back from the reception apparatus, the priorities for the remaining channels other than the channel in which the transmission is impossible may be decided.

Further, the interference amount in the reception apparatus may be an interference amount, based on reception power measured with respect to a reception signal received for each channel by the reception apparatus, from reception powers of remaining channel signals except for a reference channel signal to the reception power of the reception power of the reference channel signal.

In addition, the channel in which the transmission is impossible may be a channel in which the interference amount is less than a predetermined threshold value.

Still yet another exemplary embodiment of the present invention provides visible light communication system including, a transmission control server receiving video data and encoding the received video data with a scalable video coding (SVC) bitstream, wherein the SVC bitstream is divided into a base layer signal to be transmitted and at least one enhancement layer signal, which is combined with the base layer signal and enhances the quality of moving picture information and controlling a signal for each layer to be allocated and transmitted to a plurality of illuminations of a channel corresponding to a priority for each channel decided according to a channel state depending on an interference amount fed back from a reception apparatus according to an importance of the signal for each layer of the SVC bitstream; and a reception apparatus receiving video signals of SVC bitstreams transmitted from the plurality of illuminations and SVC-decoding the received video signals to generate video data and calculating the interference amount for each channel based on reception power measured for each channel of the received video signal and feeding back the calculated interference amount to the transmission control server.

Herein, the transmission control server may include an encoder encoding the video data into the SVC bitstream, an allocation control unit deciding a priority for each channel according to the channel state depending on the interference amount fed back from the reception apparatus, and an illumination allocation unit allocating the layer signal encoded by the encoder according to the priority for each channel decided by the allocation control unit and allocating the allocated layer signal to a plurality of illuminations corresponding for each channel.

Further, the reception apparatus may include a power measuring unit measuring reception power of each of the received video signals transmitted from the plurality of illuminations, an interference amount calculating unit calculating each interference amount for each channel by using each reception power measured by the power measuring unit and feeding back channel state information determined by the calculated interference amount for each channel to the transmission control server, an interference removing unit removing the same interference channel-to-channel interference for each video signal, a layer allocating unit allocating and outputting the signal in which the interference is removed by the interference removing unit as the layer signal of the SVC bitstream, and a decoder combining the SVC bitstreams output by the layer allocating unit and outputting the combined SVC bitstreams as the video data.

In addition, the reception apparatus may determine that a channel having a relatively large interference of the channel has a better channel state and feed back the channel to the transmission control server and the transmission control server may allocate a layer signal having high importance to an illumination of a channel having a high priority.

Moreover, the reception apparatus may set a channel in which the interference amount is less than a predetermined threshold value as a channel in which transmission is impossible and feed back the channel to the transmission control server and the transmission control server may exclude the corresponding channel at the time of deciding the priority so as not to allocate the layer signal to the illumination corresponding to the channel in which the transmission is impossible.

Advantageous Effects

According to exemplary embodiments of the present invention, a stable illumination service can be provided in an environment in which a plurality of LED illuminations is installed and at the same time, an efficient visible light communication network can be configured.

In addition, efficient visible light communication can be performed by controlling not to transmit a video signal through a channel in which a signal cannot be restored by removing co-channel interference of a visible light signal.

MODE FOR INVENTION

Figure 1:
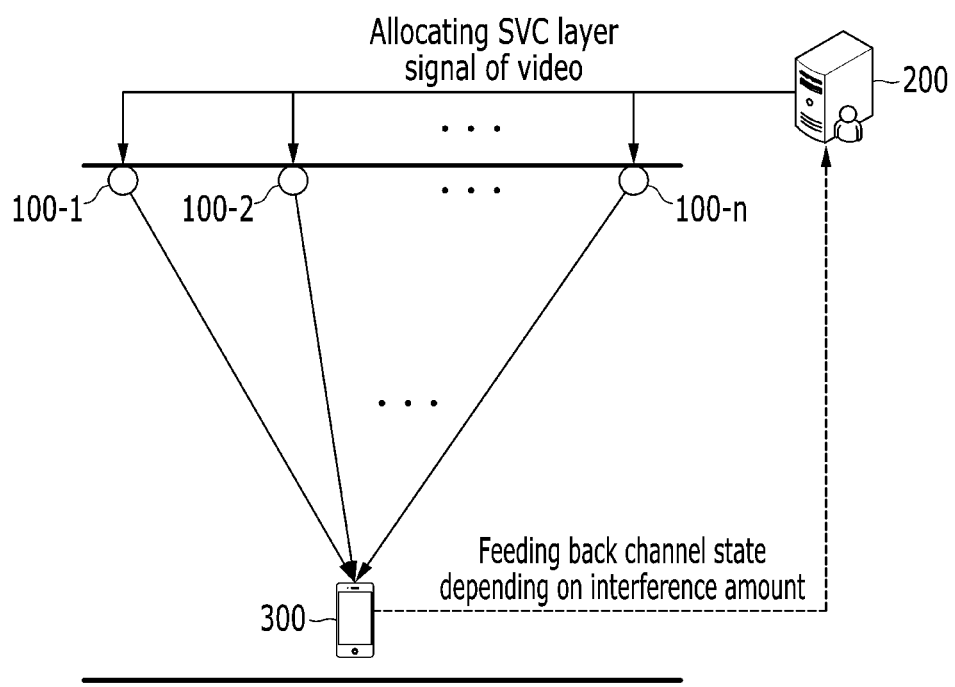
FIG. 1 is a schematic configuration diagram of a visible light communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Hereinafter, a visible light communication system according to an exemplary embodiment of the present invention will be described with reference to the accompanying drawings.

FIG. 1 is a schematic configuration diagram of a visible light communication system 10 according to an exemplary embodiment of the present invention.

Referring to FIG. 1, a visible light communication system 10 according to the exemplary embodiment of the present invention includes multiple LED illuminations 100-1, 100-2, . . . , and 100-n, a transmission control server 200, and a reception apparatus 300.

The multiple LED illuminations 100-1, 100-2, . . . , and 100-n are LED illuminations which are installed on a ceiling of a home, an office, an exhibition hall, etc., and may perform a visible light communication function together with an illumination function. Although the LED illuminations 100-1, 100-2, . . . , and 100-n may perform various visible light communication using red (R), green (G), and blue (B), the LED illuminations 100-1, 100-2, . . . , and 100-n are described by assuming that the LED illuminations 100-1, 100-2, . . . , 100-n are LED illuminations 100-1, 100-2, . . . , 100-n that perform the visible light communication by using the same wavelength band and using light of the same color in the exemplary embodiment of the present invention.

The LED illuminations 100-1, 100-2, . . . , and 100-n according to the exemplary embodiment of the present invention transmit video signals through the visible light communication as respective layer signals constituting an SVC bitstream. In this case, the SVC bitstream categorizes the video signals by using a base layer signal, a first enhancement layer signal, . . . , an n-th enhancement layer signal (n is a natural number of 2 or more) and each of the LED illuminations 100-1, 100-2, . . . , 100-n transmits the layer signal of one of the SVC bitstreams. Of course, when the number of LED illuminations 100-1, 100-2, . . . , 100-n is larger than the number of layer signals constituting the SVC bitstream, there is an illumination that does not transmit the video signal or the type of transmitted layer signal may vary depending on a visible light communication channel state.

The transmission control server 200 controls the transmission of the video signals of the multiple LED illuminations 100-1, 100-2, . . . , 100-n. That is, the transmission control server 200 controls the multiple LED illuminations 100-1, 100-2, . . . , 100-n so as to receive video data for transmitting the video, encode the video data into the layer signal according to the SVC technique, transfer the encoded layer signals to the multiple LED illuminations 100-1, 100-2, . . . , 100-n, respectively, and transmit the transferred respective layer signals to the reception apparatus 300 through the visible light communication.

In this case, the transmission control server 200 determines a priority according to channel states of the multiple LED illuminations 100-1, 100-2, . . . , 100n according to channel information depending on an interference amount fed back from the reception apparatus 300 and thereafter, allocates the layer signals to the multiple LED illuminations 100-1, 100-2, . . . , 100-n according to the priority and importance of the SVC bitstream. Herein, the importance of the SVC bitstream is the highest in the base layer signal, followed by the first enhancement signal layer, the second enhancement signal layer, . . . , the n-th enhancement signal layer.

Accordingly, the transmission control server 200 controls allocation of the base layer signal to be transmitted through the LED illumination having the highest priority according to the channel state depending on the interference amount among the multiple LED illuminations 100-1, 100-2, . . . , 100-n.

Meanwhile, the reception apparatus 300 performs the visible light communication with the multiple LED illuminations 100-1, 100-2, . . . , 100-n. That is, the reception apparatus 300 receives the layer signal of the SVC bitstream transmitted from the multiple LED illuminations 100-1, 100-2, . . . , 100-n and decodes the layer signal with the SVC bitstream to restore the video data. The reception apparatus 300 includes a portable terminal, a personal computer, a tablet computer, and the like as terminals capable of performing the visible light communication.

In this case, the reception apparatus 300 calculates the interference amount of the visible light signal received from each of the multiple LED illuminations 100-1, 100-2, . . . , 100-n, determines the channel state by the calculated interference amount, and feeds back the channel state to the transmission control server 200 as channel information. Such an interference amount is a desired-to-undesired power Ratio (DUR) calculated based on power of the signal received from each of the LED illuminations 100-1, 100-2, . . . , 100-n and such an interference amount will be described in detail later.

Figure 2:
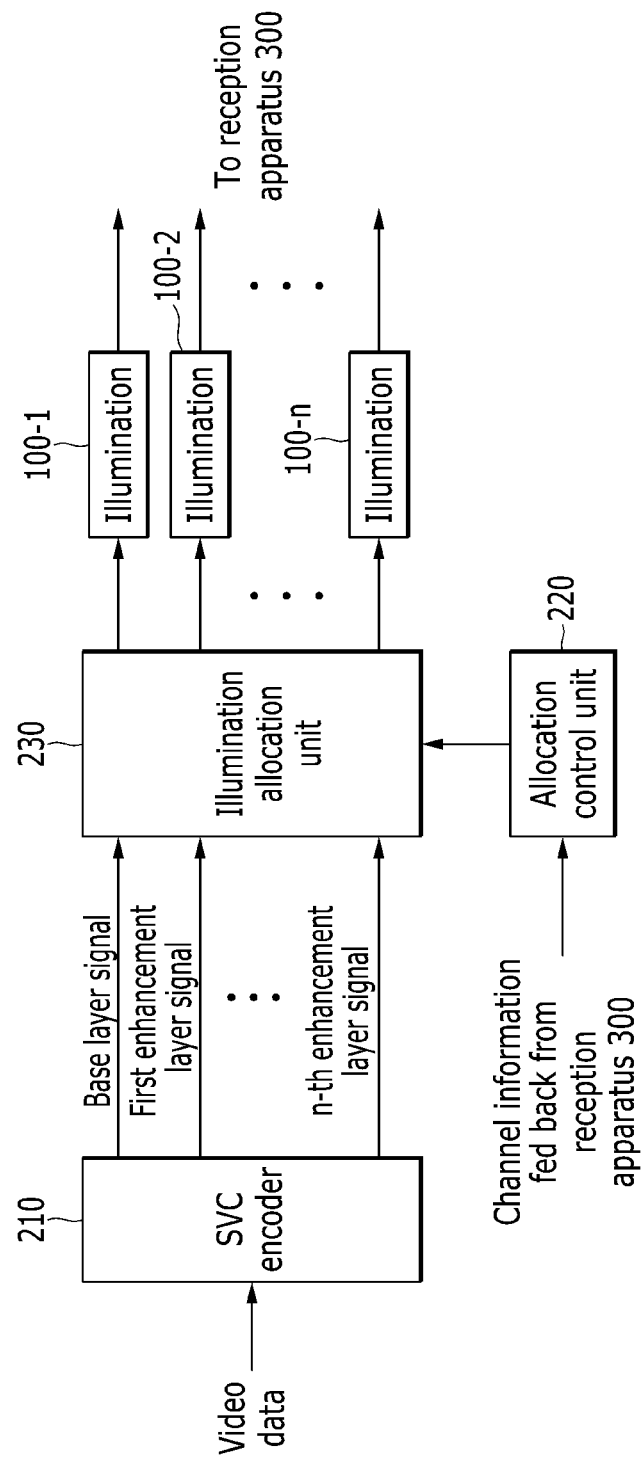
FIG. 2 is a diagram illustrating a specific configuration of a transmission control server illustrated in FIG. 1.

FIG. 2 is a diagram illustrating a specific configuration of a transmission control server 200 illustrated in FIG. 1.

As illustrated in FIG. 2, the transmission control server 200 includes an SVC encoder 210, an allocation control unit 220, and an illumination allocation unit 230. In FIG. 2, a description of a general configuration and an operation of the visible light communication system 10 according to the exemplary embodiment of the present invention, which are not related to features of the present invention, is omitted for easy description.

The SVC encoder 210 generates the video data to be transmitted as the SVC bitstream and outputs the SVC bitstream. That is, the SVC encoder 210 categorizes the video data into a base layer signal, a first enhancement layer signal, ..., an n-th enhancement layer signal and outputs the layer signals.

The allocation control unit 220 receives the channel information according to the interference amount fed back from the reception apparatus 300 to determine the priority of each channel formed between the multiple LED illuminations 100-1, 100-2, ..., 100-n and the reception apparatus 300. In this case, when there is channel information in which it is impossible to detect the signal in the reception apparatus 300 due to severe interference through the channel information fed back from the reception apparatus 300, the allocation control unit 220 may allow the priority not to be included for the corresponding channel.

The illumination allocation unit 230 allocates the layer signal output from the SVC encoder 210, that is, the base layer signal, the first enhancement layer signal, ..., the n-th enhancement layer signal to the multiple LED illuminations 100-1, 100-2, ..., 100-n according to the priority the channel transferred in the allocation control unit 220. For example, when it is assumed in FIG. 1 that the LED illumination 100-2 is closest to the reception apparatus 300 so that reception power is high and therefore, the interference amount is the largest and the channel state is the best, the allocation control unit 220 determines the priority of the LED illumination 100-2 for each channel to be the highest and the illumination allocation unit 230 allocates the base layer signal output from the SVC encoder 210 to the LED illumination 100-2. Therefore, the base layer signal having the highest importance is transmitted to the reception apparatus 300 through the LED illumination 100-2 having the best channel state, thereby enabling efficient video data transmission.

Figure 3:
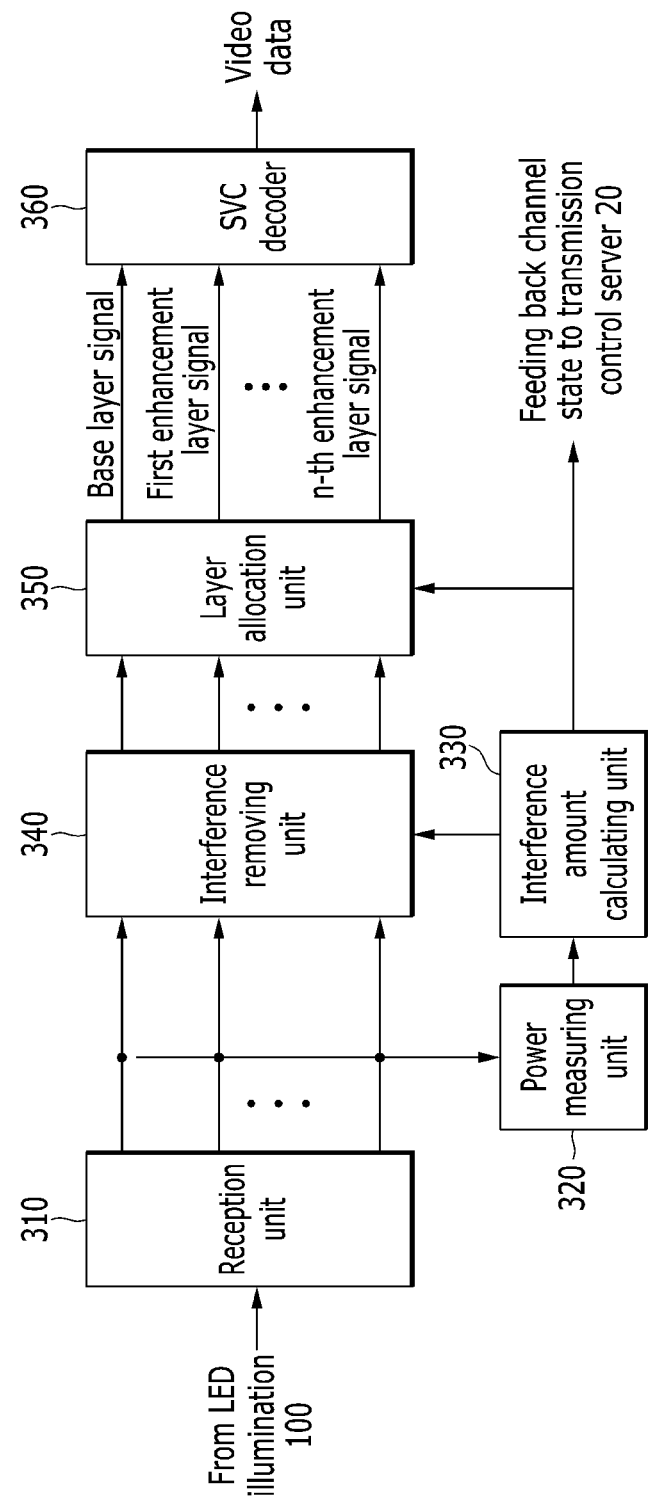
FIG. 3 is a diagram illustrating a specific configuration of a reception apparatus illustrated in FIG. 1.

FIG. 3 is a diagram illustrating a specific configuration of a reception apparatus 300 illustrated in FIG. 1.

As illustrated in FIG. 3, the reception apparatus 300 includes a reception unit 310, a power measuring unit 320, an interference amount calculating unit 330, an interference removing unit 340, a layer allocating unit 350, and an SVC decoder 360. Even in FIG. 3, a description of a general configuration and an operation of the visible light communication system 10 according to the exemplary embodiment of the present invention, which are not related to features of the present invention, is omitted for easy description.

The reception unit 310 performs reception processing for signals transmitted from the multiple LED illuminations 100-1, 100-2, ..., 100-n through the visible light communication and outputs the received signals as a received video signal. Since it will be easily understood by those skilled in the art that the reception unit 310 receives and processes the visible light signal transmitted through the visible light communication, a detailed description thereof will be omitted herein.

The power measuring unit 320 measures and outputs reception power for each received video signal output by the reception unit 310.

The interference amount calculating unit 330 calculates each interference amount for each channel using the reception power for each received video signal measured by the power measuring unit 320.

Hereinafter, a method for calculating the interference amount for each channel by the interference amount calculating unit 330 will be described.

In the exemplary embodiment of the present invention, measurement of the reception power between the multiple LED illuminations 100-1, 100-2, ..., 100-n and the reception apparatus 300 may be implemented through per-fect channel estimation. That is, a training signal for channel estimation is transmitted/received in advance before transmitting/receiving an actual video signal.

Therefore, the reception power from each of the multiple LED illuminations 100-1, 100-2, ..., 100-n to the reception apparatus 300 may be measured. Such power measurement may be performed through a received signal strength indicator (RSSI) technique or the like. The reception power is basically reduced in inverse proportion to a square of a communication distance of transmission power.

The interference amount used in the exemplary embodiment of the present invention is calculated using the reception power as the DUR.

For example, assuming that the reception power of the signal transmitted from each LED illumination in an environment where three LED illuminations are installed is Pr1, Pr2, and Pr3, the interference amount (DUR) for a signal received from one LED illumination (Pdesired) is defined as shown in [Equation 1] below as a value obtained by dividing the reception power of the LED illumination (Pdesired) by a sum of the reception powers of the remaining LED illuminations other than the LED illumination.

$$DUR[dB] = 10\log\left(P_{desired} \bigg/ \sum_{ri=1, ri \neq desired}^{N_{LED}} P_{ri}\right) \quad \text{(Equation 1)}$$

For example, the interference amount (DUR) for LED illumination #1 is calculated as shown in Equation 2 below.

$$DUR[dB]=10 \log(P_{r1}/(P_{r2}+P_{r2})) \quad \text{(Equation 2)}$$

The interference amount for each LED illumination may be calculated using Equation 1 described above.

The larger a value of the interference amount (DUR), the smaller an interference degree by other channels, which means that the channel state is good and the smaller the value, the larger the interference degree, which means that the channel state is not good.

The interference amount calculating unit 330 calculates the interference amounts of the video signals transmitted from the multiple LED illuminations 100-1, 100-2, ..., 100-n and received by the reception apparatus 300 to determine the states of the channels formed between the multiple LED illuminations 100-1, 100-2, ..., 100-n and the reception apparatus 300.

Accordingly, the interference amount calculating unit 330 feeds back the channel information including the channel state determined by the interference amount calculated for each channel to the transmission control server 200.

Next, the interference removing unit 340 removes the interference for the received video signal output from the reception unit 310. Such interference removal adopts the same channel-to-channel interference removal technique for removing the same channel-to-channel interference which occurs when the visible light communication is performed through the light of the same color using the same wavelength band in the visible light communication and such same channel-to-channel interference removal technique which removes the interference by using a power difference between the reception powers is a method that first detects a signal having a highest reception power strength and thereafter, detects signals of the remaining channels by subtracting the signal from all signals. When the repetitive operation is repeated as many times as the number of LED illuminations transmitting the signal, information of the signal under interference may be detected. The same channel-to-channel interference removal technique may detect information of a relatively highly interfered signal and is thus utilized in the visible light communication system.

Meanwhile, the same channel-to-channel interference removal technique performed by the interference removing unit 340 enables signal detection only when the interference amount DUR calculated by the interference amount calculating unit 330 satisfies a predetermined level interval. That is, when the interference amount calculated by the interference amount calculating unit 330 is very small and the interference amount does not thus satisfy the predetermined level interval, a signal component restored when the same channel-to-channel interference removal technique is performed by the interference removing unit 340 is very small, and as a result, it becomes impossible to detect the signal. Further, even when the difference in interference amount between the signals is very small, an influence due to distortion between the signals increases, and as a result, it may be impossible to detect the signal. As described above, when the layer signal of the video signal is transmitted through a channel in which it is determined that it is impossible to detect the signal by the interference removing unit 340, the transmission may be meaningless, and as a result, the signal is controlled not to be transmitted through such a channel in the exemplary embodiment of the present invention.

this end, the interference amount calculating unit 330 determines whether the interference amount calculated for each channel is smaller than a threshold value and also feeds back channel information in which the interference amount smaller than the threshold value is calculated, i.e., a transmission impossible channel information to the transmission control server 200.

Therefore, the allocation control unit 220 of the transmission control server 200 receives the transmission impossible channel information which is channel information in which the interference amount smaller than the threshold value is fed back by the interference amount calculating unit 330 is calculated and excludes the channel included in the transmission impossible channel information at the time of deciding the priority for each channel. As a result, the channel interference amount is so small that the layer signal of the video signal is not transmitted through a transmission impossible channel in which it is difficult to detect the signal by the same channel-to-channel interference removal technique.

Next, the layer allocating unit 350 allocates a signal whose interference is removed in the interference removing unit 240 based on the channel information output from the interference amount calculating unit 330, that is, channel information indicating the channel state as the layer signal of the SVC bitstream and outputs the layer signal. That is, since the base layer signal is transmitted through the best channel according to the channel state, a signal received through the corresponding channel and having the interference removed is allocated as the base layer signal and output. Of course, the channel information in this case is channel information calculated by the previously received signal.

The SVC decoder 360 combines the base layer signal, the first enhancement layer signal, . . . , the n-th enhancement layer signal output by the layer allocating unit 350 and outputs the combined layer signals as the video data.

Figure 4:
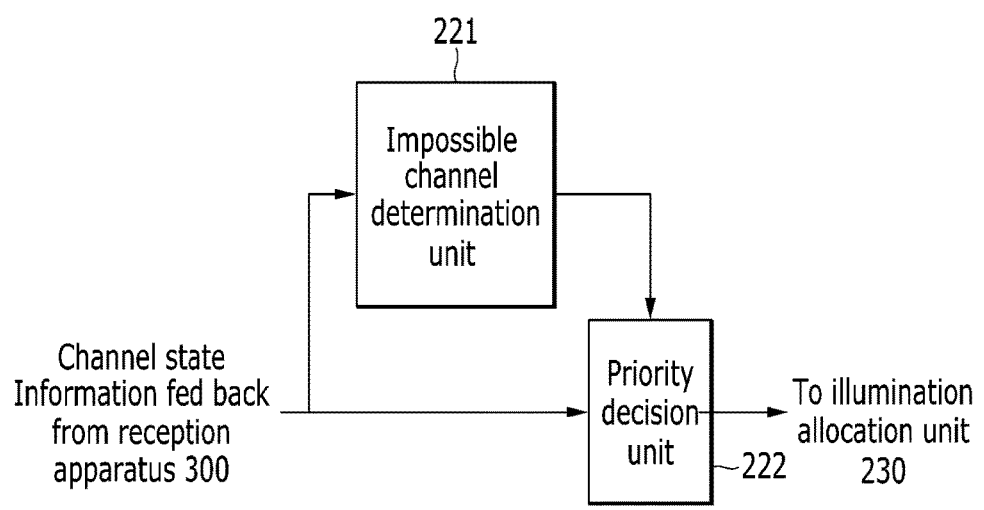
FIG. 4 is a diagram illustrating a specific configuration of an allocation control unit illustrated in FIG. 2.

FIG. 4 is a diagram illustrating a specific configuration of an allocation control unit 220 illustrated in FIG. 2.

As illustrated in FIG. 4, the allocation control unit 220 includes an impossible channel determination unit 221 and a priority decision unit 222.

The impossible channel determination unit 221 determines a channel which transmission is impossible through the transmission impossible channel information among the channel information fed back from the reception apparatus 300.

The priority decision unit 222 decides a channel to which the layer signal of the SVC bitstream is to be transmitted based on the channel state determined by the interference amount in the channel information fed back from the reception apparatus 300 and the transmission impossible channel determined by the impossible channel determination unit 221 and decides the priorities of the corresponding channels and transfers the decided priorities to the illumination allocation unit 230.

As described above, in the exemplary embodiment of the present invention, the layer signal of the SVC bitstream transmitted from the multiple LED illuminations 100-1, 100-2, . . . , 100-n is received and the channel state information based on the interference amount for each signal is fed back and the transmission control server 200 allocates and transmits the video signal so that the priority of the channel state based on the interference amount and the importance of the SVC bitstream match each other by using the feedback information, thereby enabling the transmission of the video signal according to the SVC technique and enabling efficient visible light communication.

In addition, the channel in which it is difficult to detect the signal due to the interference removal by the same channel-to-channel interference removal technique among the reception signals, i.e., the transmission impossible channel, is determined based on the interference amount and fed back and the transmission control server 200 does not transmit the layer signal of the video signal through the fed back transmission impossible channel to transmit a reliable video signal.

Next, a transmission control method according to an exemplary embodiment of the present invention will be described.

Figure 5:
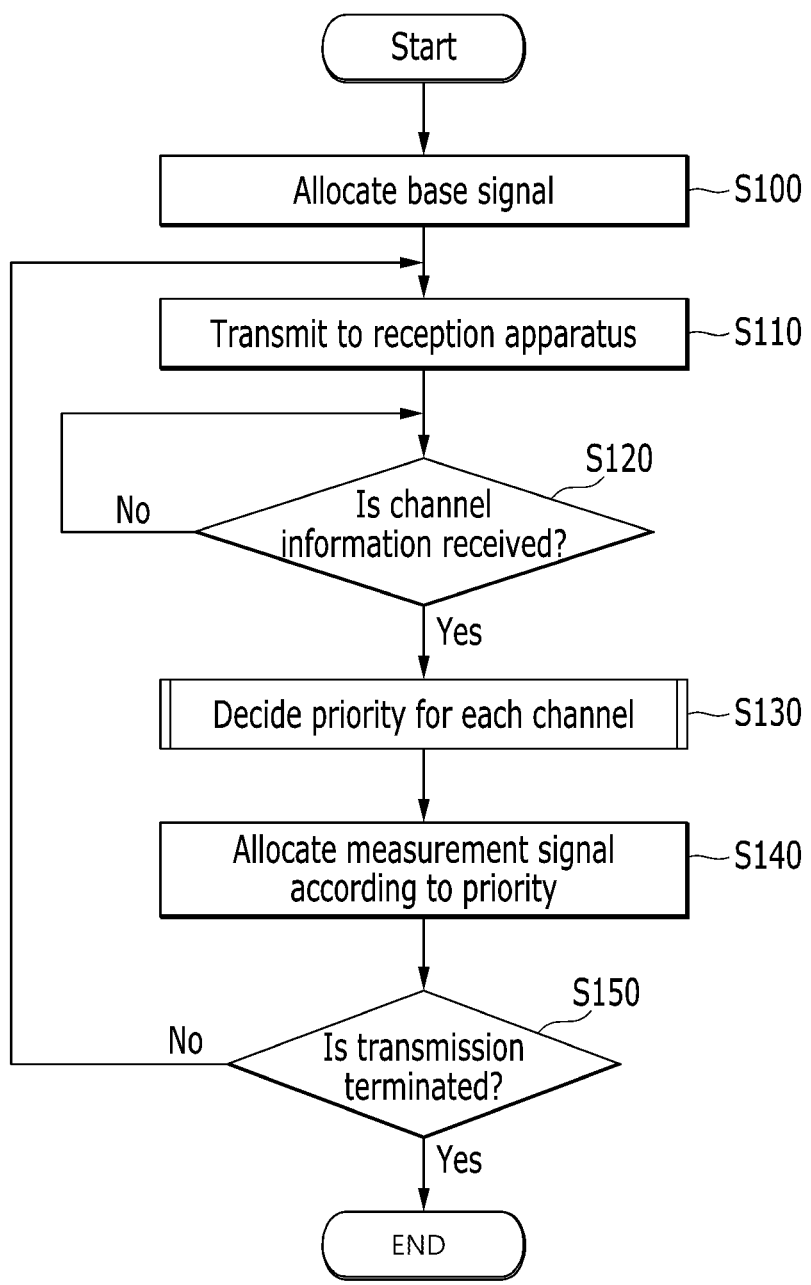
FIG. 5 is a flowchart of a transmission control method according to an exemplary embodiment of the present invention.

FIG. 5 is a flowchart of a transmission control method according to an exemplary embodiment of the present invention. In such a method, since the reception apparatus 300 feeds back the channel to the transmission control server 200 as the channel information for each layer indicating the channel state for each layer based on the calculation of the interference amount of the reception signal, only the contents performed by the transmission control server 200 will be described in detail.

Referring to FIG. 5, the allocation control unit 220 of the transmission control server 200 allocates base signals preset in an initial operation stage of the visible light communication system 10 to the LED illuminations 100-1, 100-2, . . . , 100-n and transmits the base signals to the reception apparatus 300 (S100 and S110).

Accordingly, the reception apparatus 300 receives the video signals transmitted from the LED illuminations 100-1, 100-2, . . . , and 100-n, respectively and measures the power and thereafter, calculates the interference amount for each channel based on the measured reception power and thereafter, feeds back the channel information including each channel state based on the calculated interference amount to the transmission control server 200, and as a result, the transmission control server 200 may receive the channel information fed back from the reception apparatus 300 (S120).

As described above, when the channel information is fed back and received from the reception apparatus 300, the allocation control unit 220 analyzes the channel information, determines the channel state for each layer, and determines the priority for each channel (S130).

Then, the allocation control unit 200 allocates the layer signals to the corresponding LED illuminations 100-1, 100-

2, ..., 100-n according to the determined priority and the importance of the layer signal (S140).

In addition, when it is determined that the transmission of the video signal in the visible light communication system 10 is terminated (S150) and thereafter, the transmission of the video signal is continued, step (S110) of transmitting the layer signals allocated in the step S140 to the reception apparatus 300 through the LED illuminations 100-1, 100-2, ..., 100-n is first repeatedly performed.

Figure 6:
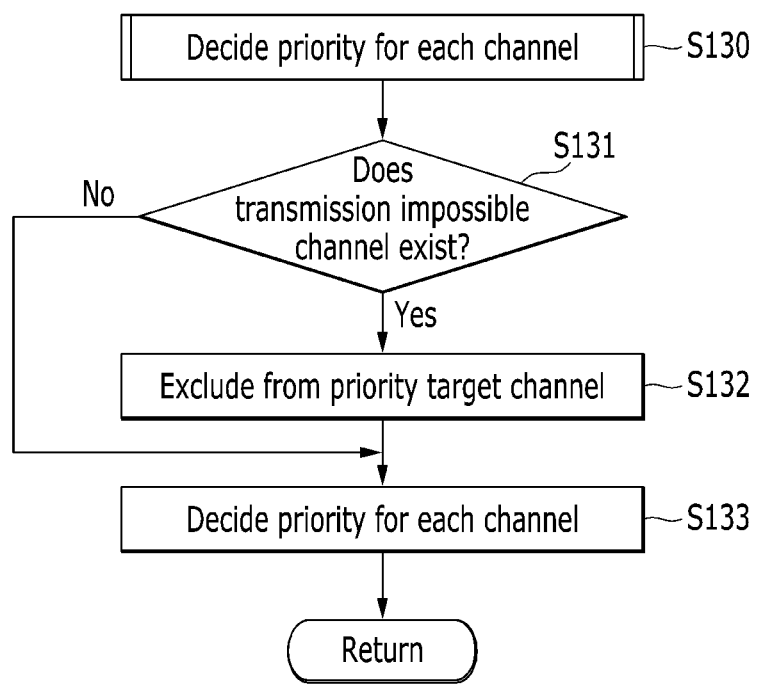
FIG. 6 is a flowchart of a method for determining a priority for a channel illustrated in FIG. 5.

FIG. 6 is a flowchart of a method for determining a priority for a channel illustrated in FIG. 5.

Referring to FIG. 6, when the channel information is fed back and received from the reception apparatus 300, the allocation control unit 220 analyzes the channel information and determines whether there is the transmissions impossible channel in which the transmission is impossible because the interference amount is less than a threshold value (S131).

When there is the transmission impossible channel, the corresponding transmission impossible channel is excluded (S132) and the priorities are decided only for the remaining channels (S133) at the time of deciding the priority for the channel in which the video signal is to be transmitted.

However, when there is no transmission impossible channel in step S131, the priorities are decided for all transmission channels (S133).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A transmission apparatus comprising:
an encoder receiving video data and encoding the received video data with a scalable video coding (SVC) bitstream, wherein the SVC bitstream is divided into a base layer signal to be transmitted and at least one enhancement layer signal, which is combined with the base layer signal and enhances the quality of moving picture information;
an allocation control unit deciding a priority for each channel according to a channel state depending on an interference amount fed back from a reception apparatus; and
an illumination allocation unit allocating the layer signal encoded by the encoder according to the priority for each channel decided by the allocation control unit and allocating the allocated layer signal to a plurality of illuminations corresponding for each channel, wherein the plurality of illuminations is illuminations which are capable of performing visible light communication with the reception apparatus,
wherein the interference amount is an interference amount, based on reception power measured with respect to a reception signal received for each channel by the reception apparatus, from reception powers of remaining channel signals except for a reference channel signal to the reception power of the reference channel signal,
wherein the allocation control unit includes,
an impossible channel determination unit determining whether there is information of a channel in which transmission is impossible among the channel information fed back from the reception apparatus, and
a priority decision unit deciding the priority for each channel by using the channel information fed back from the reception apparatus and a determination result by the impossible channel determination unit, and
the priority decision unit decides the priority for each channel only for the remaining channels except for the channel in which the transmission is impossible when it is determined that there is the channel in which the transmission is impossible by the impossible channel determination unit.

2. The transmission apparatus of claim 1, wherein:
the allocation control unit decides the priority for each channel so that a layer signal having high importance is allocated to a channel having a high priority for each channel.

3. A reception apparatus comprising:
a power measuring unit measuring reception powers of video signals of scalable video coding (SVC) bitstreams, wherein the SVC bitstreams are divided into a base layer signal to be transmitted and at least one enhancement layer signal, which is combined with the base layer signal and enhances the quality of moving picture information, transmitted from a plurality of illuminations, wherein the plurality of illuminations is illuminations capable of performing visible light communication, respectively;
an interference amount calculating unit calculating each of interference amounts for each channel by using each reception power measured by the power measuring unit and feeding back channel state information determined by the calculated interference amount for each channel to a transmission control server performing transmission control for the plurality of illuminations;
an interference removing unit performing the same interference channel-to-channel interference removal with respect to each of the video signals;
a layer allocation unit allocating a signal from which interference is removed by the interference removing unit as a layer signal of the SVC bitstream and outputting the layer signal based on the channel state information determined by the interference amount calculating unit; and
a decoder combining the SVC bitstream output from the layer allocation unit and outputting the SVC bitstream as video data;
wherein the interference amount calculating unit determines that a channel state in a channel having a large calculated interference amount is better than that in a channel having a small interference amount.

4. The reception apparatus of claim 3, wherein:
when the interference amount calculated for the channel is less than a predetermined threshold value, the interference amount calculating unit sets the corresponding channel as a channel in which transmission is impossible and feeds back the set channel to the transmission control server.

5. The reception apparatus of claim 3, wherein:
the interference amount is a value calculated by a desired-to-undesired power ratio (DUR).

6. A method for controlling transmission of a vide signal using a plurality of illuminations by a visible light communication system, the method comprising:
receiving a feedback of information of a channel state depending on an interference amount from a reception apparatus receiving video signals of scalable video coding (SVC) bitstreams, wherein the SVC bitstreams are divided into a base layer signal to be transmitted and at least one enhancement layer signal, which is combined with the base layer signal and enhances the quality of moving picture information, from the plurality of illuminations;

deciding a priority for each channel based on the channel state information; and controlling the layer signals of the SVC bitstream to be allocated to the plurality of illuminations and transmitted to the reception apparatus based on the priority for each channel and an importance for each layer of the SVC bitstream corresponding to the video data to be transmitted, wherein the deciding a priority for each channel includes, determining whether there is information of a channel in which transmission is impossible among information of channel state fed back from the reception apparatus; and deciding the priority for each channel only for the remaining channels except for the channel in which the transmission is impossible when it is determined that there is the channel in which the transmission is impossible among the information of channel state.

7. A visible light communication system comprising:

a transmission control server receiving video data and encoding the received video data with a scalable video coding (SVC) bitstream, wherein the SVC bitstream is divided into a base layer signal to be transmitted and at least one enhancement layer signal, which is combined with the base layer signal and enhances the quality of moving picture information and controlling a signal for each layer to be allocated and transmitted to a plurality of illuminations of a channel corresponding to a priority for each channel decided according to a channel state depending on an interference amount fed back from a reception apparatus according to an importance of the signal for each layer of the SVC bitstream; and a reception apparatus receiving video signals of SVC bitstreams transmitted from the plurality of illuminations and SVC-decoding the received video signals to generate video data and calculating the interference amount for each channel based on reception power measured for each channel of the received video signal and feeding back the calculated interference amount to the transmission control server;

wherein if interference amounts for specific channel is less than a predetermined threshold value, the reception apparatus feeds back information of channel status to the transmission control server, the information of channel status setting the specific channel to a channel in which transmission is impossible, and the transmission control server decides the priority for each channel only for the remaining channels except for the channel in which the transmission is impossible when there is the channel in which the transmission is impossible among the information of channel state fed from the reception apparatus.

* * * * *